United States Patent Office 2,976,293
Patented Mar. 21, 1961

2,976,293

2-(2-CYCLOHEXENYLTHIO)BENZIMIDAZOLE

John J. D'Amico, Charleston, W. Va., assignor to Monsanto Chemical Company, St. Louis, Mo., a corporation of Delaware No Drawing. Filed Dec. 30, 1959, Ser. No. 862,745

1 Claim. (Cl. 260—309.2)

This invention relates to 2-(2-cyclohexenylthio)benzimidazole which may be prepared as follows: To a stirred solution comprising 37.6 grams (0.25 mole) of mercaptobenzimidazole, 40 grams (0.25 mole) of 25% sodium hydroxide and 300 ml. of water was added in one portion 42.6 grams (0.25 mole) of 3-bromocyclohexene. After heating at 90–100° C. for 8 hours, the product was cooled to 5° C. and filtered. The precipitate was washed with water until neutral to litmus and air dried at 25–30° C. The product was obtained as a tan solid in 79.5% yield. It melted at 180–182° C. after recrystallization from ethyl acetate. Analysis gave 12.3% nitrogen and 14.3% sulfur as compared to 12.2% nitrogen and 13.9% sulfur calculated for $C_{13}H_{14}N_2S$.

The product is an intermediate for synthesis of more complex molecules and is an effective bacteriostat. Activity was demonstrated against *Staphylococcus aureus* and *Salmonella typhosa*. A 1% stock solution of 2-(2-cyclohexenylthio)benzimidazole in a non-toxic solvent was made up and this solution was added to sterile, melted nutrient agar in a quantity to give 1 part of product per 1,000 parts of agar. After thorough mixing, the agar was poured into Petri dishes and allowed to harden. One drop of a cell suspension of the bacteria served as inoculum for each plate. The inoculated plates were incubated for 2 days at a temperature of 37° C. At the end of that time inspection of the plates showed complete inhibition of growth of both the *S. aureus* and the *S. typhosa* whereas "blank" inoculated nutrient agar plates showed profuse growth.

It is intended to cover all changes and modifications of the examples of the invention herein chosen for purposes of disclosure which do not constitute departures from the spirit and scope of the invention.

What is claimed is:

2-(2-cyclohexenylthio)benzimidazole.

No references cited.